US009718722B1

(12) United States Patent
George et al.

(10) Patent No.: US 9,718,722 B1
(45) Date of Patent: Aug. 1, 2017

(54) ALUMINOPHOSPHATE GLASS COMPOSITION

(71) Applicant: SCHOTT CORPORATION, Elmsford, NY (US)

(72) Inventors: Simi George, Pittston, PA (US); Paula Vullo, Harding, PA (US); Ronald Klimek, Shavertown, PA (US)

(73) Assignee: SCHOTT CORPORATION, Elmsford, NY (US)

( * ) Notice: Subject to any disclaimer, the term of this patent is extended or adjusted under 35 U.S.C. 154(b) by 0 days.

(21) Appl. No.: 15/012,936

(22) Filed: Feb. 2, 2016

(51) Int. Cl.
| | |
|---|---|
| C03C 3/16 | (2006.01) |
| C03C 3/17 | (2006.01) |
| C03C 4/12 | (2006.01) |
| C03C 4/14 | (2006.01) |
| C03C 3/062 | (2006.01) |
| H01S 3/06 | (2006.01) |
| H01S 3/092 | (2006.01) |
| H01S 3/0941 | (2006.01) |
| H01S 3/0933 | (2006.01) |
| H01S 3/17 | (2006.01) |

(52) U.S. Cl.
CPC ............ *C03C 3/17* (2013.01); *C03C 3/062* (2013.01); *C03C 4/12* (2013.01); *C03C 4/14* (2013.01); *H01S 3/0602* (2013.01); *H01S 3/092* (2013.01); *H01S 3/0933* (2013.01); *H01S 3/0941* (2013.01); *H01S 3/175* (2013.01); *H01S 3/176* (2013.01); *H01S 3/177* (2013.01); *C03C 2204/00* (2013.01)

(58) Field of Classification Search
CPC .... C03C 3/16; C03C 3/17; C03C 3/19; C03C 3/21
See application file for complete search history.

(56) References Cited

U.S. PATENT DOCUMENTS

| 4,217,382 | A | * | 8/1980 | Toratani | ............... C03C 3/17 372/40 |
| 4,239,645 | A | * | 12/1980 | Izumitani | ............... C03C 3/17 252/301.4 P |
| 4,871,230 | A | * | 10/1989 | Yamashita | ............... C03C 3/17 385/123 |
| 4,920,081 | A | * | 4/1990 | Beall | ............... C03C 3/16 501/44 |
| 4,962,067 | A | * | 10/1990 | Myers | ............... C03C 3/16 252/301.21 |
| 5,032,315 | A | * | 7/1991 | Hayden | ............... C03C 3/062 252/301.4 P |
| 5,173,456 | A | | 12/1992 | Hayden et al. | |
| 6,911,160 | B2 | | 6/2005 | Myers et al. | |
| 7,531,473 | B2 | | 5/2009 | Myers | |
| 2006/0039426 | A1 | * | 2/2006 | Myers | ............... C03C 3/16 372/39 |
| 2006/0150682 | A1 | * | 7/2006 | Fujiwara | ............... C03B 11/08 65/102 |

OTHER PUBLICATIONS

J.S. Hayden et al., "Effect of Composition on the Thermal, Mechanical, and Optical Properties of Phosphate Laser Glasses", SPIE, vol. 1277 High-Power Solid State Lasers and Applications (1990) pp. 121-139.
S. George et al., "Tougher Glasses for Eye-safe Lasers", Proc. SPIE 9466, Laser Technology for Defense and Security XI, 94660E (May 20, 2015).

\* cited by examiner

*Primary Examiner* — Noah Wiese
(74) *Attorney, Agent, or Firm* — Millen, White, Zelano, Branigan, P.C.

(57) ABSTRACT

The invention relates to phosphate-based glasses suitable for use as a solid laser medium, doped with Er3+ and sensitized with Yb, in "eye-safe" applications. In particular, the invention relates to improving the physical properties of such phosphate-based laser glass composition, particularly with regards to strength of the glass structure and improved thermal shock resistance.

40 Claims, No Drawings

ALUMINOPHOSPHATE GLASS COMPOSITION

SUMMARY OF THE INVENTION

The invention relates to phosphate-based glasses suitable for use as a solid laser medium, doped with $Er^{3+}$ and sensitized with Yb, in "eye-safe" applications. In particular, the invention relates to improving the physical properties of such phosphate-based laser glass compositions, particularly with regards to strength of the glass structure and improved thermal shock resistance.

"Eye-safe" lasers are lasers that operate at wavelengths that are less likely to damage the eye, particularly the cornea and the retina. Laser beams having wavelengths longer than about 1.4 µm (1400 nm) are absorbed by the cornea or the vitreous humor of the eye. This absorption by the cornea or the vitreous humor avoids damage to the sensitive retina. Conversely, wavelengths shorter than about 1.4 µm are not absorbed in the cornea or the vitreous humor and thus can lead to damage to the retina. On the other hand, laser beams having wavelengths longer than 1.8 µm (1800 nm) are too strongly absorbed by the cornea and thus can cause damage to the cornea. Therefore, laser beams having a wavelength in the range of 1400 nm to 1800 nm are generally considered to be "eye-safe" lasers.

Eye-safe lasers (Class 1 Eye-Safe Lasers) are classified as lasers that cannot emit accessible laser radiation in excess of the applicable accessible laser radiation for any exposure times within the maximum duration inherent in the design or intended use of the laser. See the ANSI Z136.1 Standard (Z136.1-2000) by the American National Standards Institute. See also 21 CFR Subchapter J Part 1040.10.

Therefore, eye-safe (or retina-safe) operation of lasers in open-air is of high interest to the next generation of lasers that are being utilized for many industrial, defense, and medical applications. As mentioned above, the wavelength range considered to be the best for eye-safe operations is 1400 nm to 1800 nm. Laser emission at these wavelengths maybe achieved in many ways. However, solid hosts doped with elements from the lanthanide series remain as the most heavily utilized method for high energy laser gain. In particular, the trivalent Er ion can produce direct emission into the 1540 nm wavelength. Thus, Er is the rare-earth emitter of choice for many eye-safe applications. In recent years, the need for high beam quality under passive operation in open air applications have renewed interest in Er-doped bulk glasses as the gain material of choice for solid-state eye-safe lasers.

Phosphate glasses are known to produce high gain for the $Er^{3+}$ emission into 1540 nm, especially when sensitized with Yb. See, for example, Meyer (U.S. Pat. No. 4,962,067), Meyers (U.S. Pat. No. 7,531,473), and Meyers et al. (U.S. Pat. No. 6,911,160). Unfortunately, the phosphate glass matrix tends to be weaker than other available amorphous materials. Thus, the need exists for Er-doped phosphate glasses that exhibit stronger thermal mechanical properties. However, it is well known that the addition of the elements that drive the glass stability will decrease the laser gain obtained. It is also known that $Er^{3+}$ emission is significantly impacted by the host glass phonon energy.

Therefore, an aspect of the present invention is to provide Er-doped phosphate glasses that can function as a laser gain material with increased thermal-mechanical figure of merit (FOM) while simultaneously maintaining or increasing the laser FOM.

Another aspect of the present invention is to provide a phosphate-based glass composition for use as a solid laser medium which, like the commercial phosphate-based glass LG940 (Schott) contains Erbium, Ytterbium, Chromium, and Cerium, and which has higher thermal-mechanical FOM and a comparable, if not higher, laser FOM than LG940.

Upon further study of the specification and appended claims, further aspects and advantages of this invention will become apparent to those skilled in the art.

In accordance with the invention, there is provided an Er-doped/Yb-sensitized phosphate glass composition, which exhibits advantageous laser properties and thermo-mechanical properties, and which is suitable for use in eye-safe lasers.

In accordance with an aspect of the invention, the phosphate glass composition comprises (based on mol %):

| | |
|---|---|
| $P_2O_5$ | 55.00-65.00 |
| $Al_2O_3$ | 4.00-20.00 |
| $K_2O$ | 4.00-8.00 |
| $Na_2O$ | 8.00-18.50 |
| $Li_2O$ | 00.0-2.00 |
| $Rb_2O$ | 0.00-2.00 |
| $Cs_2O$ | 0.00-2.00 |
| $SiO_2$ | 0.00-12.00 |
| MO | 0.00-7.00 |
| $Bi_2O_3$ | 0.00-3.00 |
| $TeO_2$ | 0.00-3.00 |
| $GeO_2$ | 0.00-1.00 |
| $Nb_2O_3$ | 0.00-2.00 |
| $Sb_2O_3$ | 0.00-0.50 |
| $Cr_2O_3$ | 0.00-0.50 |
| $CeO_2$ | 0.00-0.30 |
| $Er_2O_5$ | 0.03-0.10 |
| $Yb_2O_3$ | 5.00-10.00 |
| $R_2O$ | 12.00-25.00 | wherein
$R_2O$=the sum of the amounts of $Li_2O$, $Na_2O$, $K_2O$, $Rb_2O$ and $Cs_2O$;
MO=the sum of the amounts of MgO, CaO, SrO, BaO, and ZnO; and
wherein the sum of $Al_2O_3$, $SiO_2$, and $Na_2O$ is 20.00-28.00 mol %.

According to a further aspect of the invention, the general, preferred, and especially preferred amounts (based on mol %) of the glass components are listed in the following Table 1:

| Metal Oxide | General | Preferred | Especially Preferred |
|---|---|---|---|
| $P_2O_5$ | 55.00-65.00 | 55.00-60.00 | 57.00-60.00 |
| $Al_2O_3$ | 4.00-20.00 | 4.00-18.00 5.00-7.00 or 10.00-12.00 or 15.00-20.00 | 5.00-14.00 |
| $K_2O$ | 4.00-8.00 | 5.00-7.00 | 5.50-6.50 |
| $Na_2O$ | 8.00-18.50 | 9.00-16.00 | 10.00-15.00 |
| $Li_2O$ | 0.00-2.00 | 0.00-1.00 | |
| $Rb_2O$ | 0.00-2.00 | 0.00-1.00 | 0.2-0.8 |
| $Cs_2O$ | 0.00-2.00 | 0.00-1.00 | 0.2-0.5 |
| $SiO_2$ | 0.00-12.00 | 0.00-11.00 | 4.00-11.00 |
| MO | 0.00-7.00 | 0.00-6.00 | 0.00-5.00 |
| $Bi_2O_3$ | 0.00-3.00 | 0.00-2.50 | 0.00-2.00 |
| $TeO_2$ | 0.00-3.00 | 0.00-2.50 | 0.00-2.00 |
| $GeO_2$ | 0.00-2.00 | 0.00-0.50 | 0.00-0.10 |
| $Nb_2O_3$ | 0.00-2.00 | 0.50-2.00 | 0.50-1.50 |
| $Sb_2O_3$ | 0.00-0.50 | 0.05-0.30 | 0.05-0.20 |
| $Cr_2O_3$ | 0.00-0.30 | 0.01-0.10 | 0.02-0.05 |
| $CeO_2$ | 0.00-0.30 | 0.00-0.20 | 0.10-0.20 |
| $Er_2O_5$ | 0.03-1.00 | 0.03-0.08 | 0.05-0.08 |
| $Yb_2O_3$ | 5.00-10.00 | 6.00-10.00 | 7.00-10.00 |

| Metal Oxide | General | Preferred | Especially Preferred |
| --- | --- | --- | --- |
| $R_2O$ | 12.00-25.00 | 14.00-22.00 | 15.00-21.00 |
| $\Sigma\,Al_2O_3$, $SiO_2$, and $Na_2O$ | 20.00-28.00 | 22.00-28.00 | 25.00-28.00 |

The glass composition according to the invention employs $P_2O_5$ as the principle glass network former. The level of $P_2O_5$ is preferably maximized. Generally, the $P_2O_5$ content is 55.00-65.00, preferably 55.00-60.00, especially 57.00-60.00 mole %. The $P_2O_5$ content can also be, for example, 55.0, 55.5, 56.0, 56.5, 57.0, 57.5, 58.0, 58.5, 59.0, 60.0, 60.5, 61.0, 62.0, 62.5, 63.9, 64.0, 64.5, 65.0, etc., mole %.

$Al_2O_3$ also act as a network former, and tends to enhance the chemical durability of the glass, and reduce water solubility. $P_2O_5$ acts as the primary network former, whereas $Al_2O_3$ acts an as intermediate glass former.

In the present glass composition, $SiO_2$ acts as a modifier. Amounts of $SiO_2$ can increase thermal conductivity. However, large amounts of $SiO_2$ may increase the crystallization tendency and/or lead to phase separation, and may reduce emission cross section. The amount of $SiO_2$ used in preparing the glass is generally 0.0-12.0 mol %, preferably 0.0-11.0 mol %, especially 4.0-11.0 mol %, such as 9.0-10.0 mol %. The $SiO_2$ content can also be, for example, 0.5, 1.0, 2.0, 3.0, 4.0, 5.0, 6.0, 7.0, 8.0, 9.0, 9.5, 10.0, 10.5, 11.0, or 11.5 mol %.

As noted, $Al_2O_3$ acts as an intermediate glass former. As a result, $Al_2O_3$ exhibit characteristics of both a glass former and a glass modifier. $Al_2O_3$ can provide not only better chemical durability, but also better thermo-mechanical properties. However, high amounts of $Al_2O_3$ may induce crystallization, and reduce emission cross section and thermal expansion coefficient. The level of $Al_2O_3$ is generally 4.0 to 20.00, preferably 4.0 to 18.0 mol %, especially 5.0-7.0 mol % or 10.0-12.0 mol % or 15.0-18.0 mol %. Other suitable levels of $Al_2O_3$ are, for example, 5.0, 5.5., 6.0, 7.0, 7.5, 7.8, 8.0, 8.5., 9.0, 9.5, 10.0, 10.5, 11.0, 11.5, 12.0, 12.5, 13.0, 13.5, 14.0, 14.5., 15.0, 15.5, 16.0, 16.5, 17.0, and 17.5 mol %.

The alkaline earth metals, MO, can enhance the chemical durability properties of the glass. In general, the amount of MO is 0.0-7.0 mol %, preferably 0.0-6.0 mol %, especially 0.0-5.0 mol %. If present, the preferred alkaline earth metal is MgO, since amounts of MgO tend to provide higher thermal-mechanical FOM.

The alkali metals content, $R_2O$, will impact certain properties of the glass such as linear thermal expansion coefficient and emission cross section. In general, the amount of $R_2O$ is 12.00-25.00 mol %, preferably 14.00-22.00 mol %, and especially 15.00-21.00 mol %. Other levels of $R_2O$ are, for example, 14.5, 15.0, 15.5, 16.0, 16.5, 17.0, 17.5, 18.0, 18.5., 19.0, 19.5, 20.0, 20.5, 21.0, and 21.5 mol %.

Preferably, the alkali metals present include both $K_2O$ and $Na_2O$. Generally, the amount of $K_2O$ in the glass is 4.00-8.00 mol %, preferably 5.0 to 7.0 mol %, especially 5.50-6.50 mol %. Other suitable levels of $K_2O$ are, for example, 4.5, 4.8, 5.1, 5.2. 5.4, 5.6, 5.7, 5.8, 5.9, 6.0, 6.1, 6.2, 6.3, 6.4, 6.8, 7.1, 7.5, and 7.8 mol %. Generally, the amount of $Na_2O$ in the glass is 8.00-18.50 mol %, preferably 9.0 to 16.0 mol %, especially 10.0-15.0 mol %. Other suitable levels of $Li_2O$ are, for example, 9.5, 10. 5, 11.0, 12.0, 13.0, 14.0, and 17.0 mol %. The amounts of each of $Li_2O$, $Rb_2O$, and $Cs_2O$ are generally each 0.0-2.0 mol %, preferably 0.0-1.0 mol %.

The combined amount of $Al_2O_3$, $SiO_2$, and $Na_2O$ is generally 20.00-28.00 mol %, preferably 22.00-28.00 mol %, especially 25.00-28.00 mol %.

The lasing ion of the glass composition is $Er^{3+}$ with the $Yb^{3+}$, $Cr^{3+}$, and/or $Ce^{3+}$ act as sensitizers. In general, the amount of $Er_2O_3$ is 0.03-1.00 mol %, preferably 0.03-0.50, especially 0.03-0.10, for example, 0.03-0.08 mol %, especially 0.05-0.08 mol %. Other suitable levels of $Er_2O_3$ are 0.04, 0.06, 0.07, 0.09, 0.11, 0.12, 0.15, 0.18, 0.20, 0.22, 0.25, 0.28, 0.30, 0.33, 0.35, 0.4, 0.45, 0.55, 0.6, 0.65, 0.7, 0.75, 0.8, 0.85, 0.9, and 0.95.

Preferably, at least $Yb_2O_3$ is used as a sensitizer. The amount of $Yb_2O_3$ is preferably up to the solubility limit for $Yb_2O_3$ in the glass. In general, the amount of $Yb_2O_3$ is 5.00-10.00 mol %, preferably 6.00-10.00 mol %, especially 7.00-10.00 mol %. Other suitable levels of $Yb_2O_3$ are, for example, 5.5, 6.5, 7.5, 7.8, 8.0, 8.3, 8.5, 8.7, 9.0, and 9.5 mol %. The amount of $Cr_2O_3$ is generally 0.00-0.30 mol %, preferably 0.01-0.10 mol %, especially 0.02-0.05 mol %. Other suitable levels of $Cr_2O_3$ are, for example, 0.02, 0.03, 0.04, 0.06, 0.07, 0.08, and 0.09 mol %. The amount of $CeO_2$ is generally 0.00-0.30 mol %, preferably 0.00-0.20 mol %, especially 0.10-0.20 mol %. Other suitable levels of $CeO_3$ are, for example, 0.02, 0.03, 0.04, 0.06, 0.07, 0.08, 0.09, 0.10, 0.13, 0.15, 0.18, 0.21, 0.25, and 0.28 mol %.

The total amount of $Er_2O_3$, $Yb_2O_3$, and $CeO_2$ is preferably 5.03-11.30, preferably 6.0-9.5, especially, 7.0-9.5, for example, 8.0-9.5, 6.0-9.0, 7.0-9.0, and 8.0-9.0. Additionally, $Er_2O_3$, $Yb_2O_3$, $CeO_2$, and $Cr_2O_3$ the glass contains no appreciable amounts of further lasing ions and sensitizers, for example, the glass preferably contains 0.0 mol % $N2_2O_3$.

With regards to the additional components, the glass optionally contains refining agents (e.g., $As_2O_3$ and $Sb_2O_3$) and/or antisolarants (e.g., $Nb_2O_5$). In general, the amount of $Sb_2O_3$ (or $As_2O_3$) is 0.00-0.50 mol %, preferably 0.05-0.30 mol %, especially 0.05-0.20 mol %. The amount of $Nb_2O_5$ is generally 0.00-2.00 mol %, preferably 0.50-2.00 mol %, especially 0.50-1.50 mol %.

In addition, the glass composition may additional modifiers such as $BiO_2O_3$, $TeO_2$ and $GeO_2$. The amount of each of $Bi_2O_3$ and $TeO_2$ is generally 0.00-3.00 mol %, preferably 0.00-2.50 mol %, especially 0.00-2.00 mol %. However, even small amounts of some modifiers such $GeO_2$ as can lead to instability. Therefore, the amounts of $GeO_2$ is preferably minimized, generally 2 mole % or less, preferably 0.05 mol % or less, especially 0.10 mol % or less.

The glass according to the invention can be characterized as a high lanthanate glass system where in the entire rare earth and sensitizer content (Ce+Cr+Er+Yb) can be replaced with La to make an optical glass, such as a cladding for an optical fiber. Thus, another aspect of the invention is an optical glass composition, such as cladding for a fiber, comprising the following components (based on mol %):

| | |
| --- | --- |
| $P_2O_5$ | 55.00-65.00 |
| $Al_2O_3$ | 4.00-20.00 |
| $K_2O$ | 4.00-8.00 |
| $Na_2O$ | 8.00-18.00 |
| $Li_2O$ | 00.0-2.00 |
| $Rb_2O$ | 0.00-2.00 |
| $Cs_2O$ | 0.00-2.00 |
| $SiO_2$ | 0.00-12.00 |
| MO | 0.00-7.00 |
| $Bi_2O_3$ | 0.00-3.00 |
| $TeO_2$ | 0.00-3.00 |

-continued

| | |
|---|---|
| GeO₂ | 0.00-1.00 |
| Nb₂O₃ | 0.00-2.00 |
| Sb₂O₃ | 0.00-0.50 |
| La₂O₃ | 5.00-10.00 |
| R₂O | 4.00-12.00 | wherein $R_2O$=the sum of the amounts of $Li_2O$, $Na_2O$, $K_2O$, $Rb_2O$ and $Cs_2O$;

MO=the sum of the amounts of MgO, CaO, SrO, BaO, and ZnO; and wherein the sum of $Al_2O_3$, $SiO_2$, and $Na_2O$ is 20.00-28.00 mol %.

To be useful for the generation of high average power, phosphate-based laser glass should possess advantageous thermal-mechanical properties. During operation, cooling of the exterior surfaces of the solid laser material will result in the formation of a thermal gradient wherein the internal temperature of the material is higher than the temperature of the external surfaces. This thermal gradient can then lead to a stress gradient within the solid laser material which can eventually result in fracture of the active solid laser material.

In general, the thermal-mechanical properties of lasers are assessed by a parameter called the thermal-mechanical figure of merit, TM-FOM. The thermal mechanical figure of merit is proportional to the maximum thermal gradient that the material can tolerate without fracture, and also reflects the magnitude of the thermal gradient for a given situation.

In accordance with the invention, the thermal-mechanical figure of merit, TM-FOM, is calculated by the following formula:

$$\text{TM-FOM}=K_{90C}K_{IC}(1-v)/(\alpha E)$$

wherein $K_{90C}$ is the Thermal Conductivity measured at 90° C. [W/mK], $K_{IC}$ is the Indentation Fracture Toughness [MPa·m$^{0.5}$], $v$ is Poisson's ratio, E is Young's modulus [GPa]; and $\alpha$ is the Linear Coefficient of Thermal Expansion, over 20-300° C. [$10^{-7}$/K].

Thus, as can be seen from the above equation, to increase the TM-FOM it is desirable to have a high thermal conductivity and a lower coefficient of thermal expansion, Poisson's ratio, and Young's modulus. For a given thermal gradient, the amount of stress in the glass part is reduced as the product of thermal expansion and Young's modulus is lower. Higher values of thermal conductivity help to reduce the magnitude of the thermal gradient that results for a given amount of heat deposited into the glass.

Additionally, in accordance with the invention, the laser figure of merit, L-FOM, is calculated by the following formula:

$$\text{L-FOM}=\sigma_{em}*(\tau_{meas}/\tau_{rad})$$

wherein $\sigma_{em}$ is the maximum emission cross section, [$\times 10^{-20}$ cm²], $\tau_{meas}$ is the measured radiative lifetime, (μsec);

$\tau_{rad}$ is the calculated radiative lifetime, (μsec);

Laser properties can be measured in accordance with the Judd-Ofelt theory, the Fuchtbauer-Ladenburg theory, or the McCumber method. A discussion of the Judd-Ofelt theory and the Fuchtbauer-Ladenburg theory can be found in E. Desurvire, *Erbium Doped Fiber Amplifiers*, John Wiley and Sons (1994). The McCumber method is as discussed in, for example, Miniscalco and Quimby, Optics Letters 16(4) pp 258-266 (1991). See also Kassab, Journal of Non-Crystalline Solids 348 (2004) 103-107. The Judd-Ofelt theory and the Fuchtbauer-Ladenburg theory evaluate laser properties from an emission curve, whereas the McCumber method uses the absorption curve of the glass.

Regarding emission bandwidth, if one has a measured emission curve (such as collected in a Judd-Ofelt or Fuchtbauer-Ladenburg analysis) or a calculated emission curve (from a McCumber analysis) one can get emission bandwidth in two ways. The first way is to simply measure the width at half of the maximum value (called emission bandwidth full width half maximum or $\Delta\lambda_{FWHM}$).

The Examples presented below are part of a study to strengthen the commercially available laser glass LG940 (SCHOTT) by adding modifiers in an attempt to improve the strength of the starting phosphate glass structure, while not adversely affecting laser properties.

LG-940 is an Erbium-Ytterbium-Chromium-Cerium doped phosphate based laser glass that is used in flashlamp pumped and diode pumped solid-state laser systems. LG940 exhibits a high cross-section and a high solubility for rare earths, and is relatively easy to manufacture.

A large compositional study with systematic variations of the alkali and alkaline earths in a commercial phosphate laser glass was previously conducted. See Hayden et al., "Effect of composition on the thermal, mechanical, and optical properties of phosphate laser glasses," Proc. SPIE 1277, High-Power Solid State Lasers and Applications, 121 (Aug. 1, 1990). However, this study investigated phosphate glasses doped with $Nd^{3+}$, not $Er^{3+}$.

EXAMPLES

In the present case, 21 modifications of the LG940 glass were prepared. Initially, glasses were prepared the prescribed proportions of various powdered raw materials were mixed together such that the total amount of each batch would produce approximately 200 g of cast glass. These batches were placed into fused silica crucibles and placed into a resistance furnace at temperatures exceeding 1,000° C. Once melted and refined, the molten glass was cast and annealed over a period of time. Those glasses that were determined to be a good fit for the thermodynamical conditioning involved in standard manufacturing processes (e.g., readily formed a glass and showed a decrease in the thermal expansion coefficient) were repeated at a larger scale (e.g., 0.5 L). The larger scale melting was accomplished using electrical induction, and the molten liquid was stirred and refined at temperatures in excess of 1,000° C. Once the casting and forming processes were complete, samples for measurements were fabricated from these glasses. All required properties and measurements for analysis were completed on each manufactured composition.

Density is measured using the Archimedes method with a standard accuracy of ±0.003 g/cm³. The coefficient of thermal expansion, CTE, ($\alpha_{20-300°\ C.}$, ±0.03 ppm/° C.) and the glass transformation point, $T_g$, (±5° C.) are determined using the dilatometric analysis. Dilatometric, beam bending (3-point) and softening point methods are used to determine the temperature corresponding to particular viscosities, including annealing point ($3.16\times10^{14}$ poise), strain point ($1\times10^{13}$ poise) and softening point ($3.98\times10^7$ poise). High temperature rheometry is used to determine the melt viscosity around the working point of the glass ($1\times10^4$ poise). These individual points were then fit using the well-known Volger-Fulcher-Tammann (VFT) model.

Differential thermal analysis (DTA) is used to examine the relative devitrification stability of each composition. Hardness and fracture toughness are measured using a Vickers indentation method with a 3N load. Young's modulus is determined using an impulse excitation technique. Refractive index measurements are made using a standard V-block method and these are then used to calculate values for dispersion, V''' refractive index at the lasing wavelength, and the nonlinear refractive index, n2. Transmission curves are obtained using a Perkin Elmer Lambda 900® or Lambda 1050® spectrophotometer using prescribed scan conditions within the window of 200 nm to 2500 nm. The dn/dT measurements are made using the solid etalon method. The measurement is made at respective wavelengths for the ions of interest and over a temperature range from 25° C.-30° C. The instrument measures the temperature dependent shift in wavelength of the interference fringe ($\Delta\lambda$) as the temperature is cycled up and down through the temperature range. The collected data is then used to calculate the dn/dT of the sample over the temperature interval. See S. George et al., SPIE Photonics West, Paper No. 9342-46, PW15L-LA101-71, 2015 presentation, hereby incorporated by reference.

The presence of hydroxyl impurities in the glass can non-radiatively quench the laser excited state. See G. C. Righini et al., "Photoluminescence of Rare-Earth-Doped Glasses," Rivista del Nuovo Cimento, 28(12), 1-53 (2005). Conventional melt-quenching processes used for manufacturing glasses can introduce residual OH" species relatively easily, which will then affect the fluorescence decay of $Er^{3+}$ ions at 1.5 μm, resulting in reduced quantum efficiencies. The impact is typically most noticeable in the lifetime measurements. As a result, the residual hydroxyl content is monitored for all the glasses produced by utilizing the absorption features present near 3333 $cm^{-1}$ (3.0 μm) and 3000 $cm^{-1}$ (3.333 μm). The method utilized assumes proportionality between the concentration of the OR species and the measured absorption. The amplitude of the hydroxyl absorption at the two prior mentioned wavelengths allows for the estimation of concentration by the Beer-Lambert law. The ppm level concentrations in the glass are not explicitly calculated, but rather are set a value for maximum tolerable level for absorption. For a laser grade glass gain element, the absorption is desirably less than 2.0 $cm^{-1}$ and most preferably less than 1.8 $cm^{-1}$ at the wavelength of 3000 nm regardless of the active ion present in the glass.

Fluorescence emission lifetime measurements are completed on a 10 mm cube sample and also on a powdered glass layer (in order to avoid self-pumping by the Er ions, leading to longer decay times from the cubed samples). The samples are prepared from each melt with two adjacent sides polished and the remaining four sides being fine ground. The samples are excited through one polished face at nominally 980 nm with a laser diode, and emission is collected thorough the orthogonal polished face. The fluorescence lifetimes of erbium and ytterbium are measured separately by selecting 1550 nm and 1000 nm emitted light with 10 nm FWHM interference filters. Careful analysis of the temporal emission from ytterbium also allows for the determination of energy transfer efficiency for each of the samples doped with both erbium and ytterbium. The fluorescence lifetime, designated as τ, is then calculated by fitting the data from t=0 to a point where the intensity has fallen to less than 1/e of its initial value. Additional details are described in S. George et al. SPIE Photonics West, Paper No. 9342-46, PW15L-LA101-71, 2015 presentation, hereby incorporated by reference. See also http://www.pti-nj.com/brochures/QuantaMaster.pdf, E. Desurvire, Erbium-doped Fiber Amplifiers Principles and Applications, John Wiley and Sons, pg. 244-245 (1994), and S. George et al, Tougher Glasses for Eye-safe Lasers, Proc. SPIE 9466, Laser Technology for Defense and Security XI, 94660E (20 May 2015) [http://spie.org/Publications/Proceedings/Paper/10.1117/12.2176235?origin_id=x4318], hereby incorporated by reference.

The QuantaMaster™ 50 NIR steady state spectrofluorometer from Photon Technology International [See D. E. McCumber, Phys. Rev. 134, A299 (1964)] is used for all emission measurements. The instrument uses a TE-cooled InGaAs detector where the sensitivity is enhanced by using an optical chopper to modulate the excitation light and a lock-in amplifier on the detector end.

Laser properties of radiative lifetime and cross sections for stimulated absorption and emission as a function of wavelength are calculated for Er and Yb doped glasses by a simplification of Judd-Ofelt (JO) theory often referred to in the literature as the Fuchtbauer-Ladenburg (FL) relation. A brief description is provided in S. George et al, Tougher Glasses for Eye-safe Lasers, Proc. SPIE 9466, Laser Technology for Defense and Security XI, 94660E (20 May 2015), hereby incorporated by reference. Additional details are provided in S. George et al. SPIE Photonics West, Paper No. 9342-46, PW15L-LA101-71, 2015 presentation, http://www.pti-nj.com/brochures/QuantaMaster.pdf, E. Desurvire, Erbium-doped Fiber Amplifiers Principles and Applications, John Wiley and Sons, pg. 244-245 (1994), hereby incorporated by reference.

Radiative lifetime is determined by the following equation (1):

$$1/\tau_{rad} = 8\pi c n^2 [(2J'+1)/\lambda^4_{abs\,max}(2J+1)] \int \alpha(\lambda)d\lambda \quad (1)$$

where J' and J are the total momentum of the lower and upper levels, in the case of erbium 15/2 and 13/2, respectively, and the integration is taken from 1400 nm to 1700 nm.

The emission cross section is then determined by the following equation (2):

$$\sigma_{emm}(\lambda) = \lambda^4 g(\lambda)/[8\pi c n^2 \tau_{rad}] \quad (2)$$

where g(λ) is the lineshape function obtained from the emission data, I(λ), collected with a PTI QM50 fluorescence spectrometer, $$g(\lambda) = I(\lambda)/\int I(\lambda)d\lambda \quad \text{(equation (3))}.$$

The compositions of the 22 glasses prepared in the initial small scale manufacturing (200 g) are listed in Tables 1A and 1B below. During the initial small scale manufacturing of the 22 glasses (LG940 and 21 modifications), one composition (Example 14) showed to be wholly unsuitable for the melt-quenching processes utilized. Two more compositions (Examples 13 and 22) showed tendencies for devitrification. The remaining nineteen glasses were stable for all processes. A set of properties including refractive index (measured at the Fraunhofer "D" line, the center of the yellow sodium double emission at 589 nm), dispersion, density, coefficient of thermal expansion (CTE), glass transition temperature (Tg), and the fluorescence lifetimes for Er and Yb were collected on these 19 glasses. Based on these properties, seven compositions were selected for larger scale manufacturing and detailed characterization. Table 2 lists standard material properties of the 7 glasses for comparison. Nominal ion concentrations in all of these glasses are $0.2\times10^{20}$ ions/$cm^3$ Er and $23.5\times10^{20}$ ions/$cm^3$ Yb.

From a glass strength perspective, low CTE, high thermal conductivity, and a high value for fracture toughness are key properties. Fracture of a laser component occurs when induced stresses exceed the tensile strength during pumping. The theoretical tensile strength of a defect free material may be approximated by the following equation (4)

$$\sigma_{max} \approx E/10. \qquad (4)$$

where E is the Young's modulus (GPa). See, e.g., R. Feldman et al., "Thermochemical strengthening of Nd:YAG laser rods", Proc. SPIE 6190, Solid State Lasers and Amplifiers II, 619019 (Apr. 17, 2006).

In the real world, there is a very large difference between the theoretical fracture limit of a material in the Giga-Pa range and the achievable component fracture limit in a cavity which is in the Mega-Pa limit. The discrepancy is especially large in the case of an actively cooled laser rod under repetitive heat load. The descriptive formalism starts with the heat dissipated by a rod per unit volume as a function of the absorbed pump power. In the case of Er, there is also energy transfer upconversion that affects the dissipated heat in a gain material, but this is ignored in the simple treatment. A fraction of the absorbed laser pump energy may be converted into heat by quantum defect heating. The total heat dissipated by the laser rod, $P_h$, is then a function of optical pump power and the fractional thermal load, as shown in equation (5):

$$P_h = (1 - P/\lambda L)P_p. \qquad (5)$$

Thermal gradients exist in a cooled laser rod (or in other geometries like a slab), where the center of the rod is hotter than the surface of the rod that is in contact with the cooling medium. In this case, the power of the heat dissipated can be related to the temperature differential by equation (6):

$$P_h = T(0) - T(r_0) \cdot 4\pi KL \qquad (6)$$

where $T(0)$ and $T(r_0)$ are the temperatures at the rod center and the rod surface, K is the thermal conductivity of the material, and L is the total length of the rod. Then, the edge to center heat differential is proportional to the absorbed power and the thermal conductivity and these temperature gradients induce mechanical stresses tangentially, radially, and axially in gain component. When these stresses exceed the tensile strength of the rod, it leads to fracture. See, e.g., W. Koechner, Solid State Laser Engineering, 6th ed., Springer, Berlin, (2006) p.439-481.

In the rod case, then, the total surface stress (to rupture) is the vector sum of the tangential and axial components and takes into account the fundamental material properties, as shown in equation (7):

$$\sigma_T = [\alpha E/8\pi K(1-\nu)] \cdot P_h L = \sqrt{2}\sigma_\phi. \qquad (7)$$

where K is the thermal conductivity is the thermal conductivity measured at 90° C. ($K_{90C}$) [W/mK], $\nu$ is the Poissons ratio, E is Young's modulus (GPa), $\alpha$ is the linear coefficient of thermal expansion ($K^{-1}$), and $\sigma_\phi$ is the hoop(tangential) stress. See, e.g., R. Feldman et.al., "Thermochemical strengthening of Nd:YAG laser rods", Proc. SPIE 6190, Solid State Lasers and Amplifiers II, 619019 (Apr. 17, 2006) and W. Koechner, Solid State Laser Engineering, 6th ed., Springer, Berlin, (2006) p.439-481.

Further, the actual rupture stress is a function of the surface finish of a component and related by equation (8):

$$\sigma_T = [\alpha E/8\pi K(1-\nu)] \cdot P_h L = YK_{IC}/\sqrt{a} \qquad (8)$$

where $K_{IC}$ is the indentation fracture toughness (MPa·m$^2$), Y is a fracture orientation/geometry factor and is on the order of unity, and a is the average depth of surface flaws introduced during the grinding and polishing steps of the fabrication procedure.

In terms of heat dissipated per unit length in the rod, this then becomes equation (9), wherein $R_s$ is thermal shock resistance:

$$P_h = [8\pi K(1-\nu)/\alpha E] \cdot \sigma T \cdot L = 8\pi R_s L \qquad (9)$$

For materials development purposes, the intrinsic material properties from equation 9 are used as the TM-FOM in order to evaluate the suitability by comparative ranking. Thus, the TM-FOM is described by the thermal shock resistance parameter as set forth in equation (10):

$$\text{TM-FOM} = R_s = K(1-\nu)K_{IC}/\alpha E [W/m^{1/2}] \qquad (10)$$

See, for example, W. Koechner, Solid State Laser Engineering, 6th ed., Springer, Berlin, (2006) p.439-481; J. H. Campbell, J. S. Hayden, and A. Marker, High-Power Solid-State Lasers: a Laser Glass Perspective. International Journal of Applied Glass Science, 2: 3-29(2011); and W. F. Krupke, M. D. Shinn, J. E. Marion, J. A. Caird, and S. E. Stokowski, "Spectroscopic, optical, and thermomechanical properties of neodymium- and chromium-doped gadolinium scandium gallium garnet," J. Opt. Soc. Am. B 3, 102-114 (1986).

Equation (10) directly provides the maximum thermal load that a surface cooled glass component can tolerate before total failure, especially when considering higher repetition rate operation. Therefore, the best materials will have the largest value for $R_s$(TM-FOM).

TM-FOMs are compared in Table 3 for the seven compositions selected for larger scale manufacturing.

A concise treatment of thermally induced wavefront distortions arising from gain material properties is described in Davis et al., "Thermal lensing of laser materials", in Laser-Induced Damage in Optical Materials: 2014, Gregory J. Exarhos; Vitaly E. Gruzdev; Joseph A. Menapace; Detlev Ristau; M J Soileau, Editors, Proceedings of SPIE Vol. 9237 (SPIE, Bellingham, Wash. 2014), 92371. In this paper, the classic case of a uniformly heated cylindrical rod with its outer surface at a constant temperature is presented, such as what would be encountered in the case of a CW-pumped, strongly-cooled rod under steady-state conditions. For the relative ranking of materials during development, as presented in this paper, the thermo-optic response is considered with respect to the change in index as a function of temperature as shown in equation (11):

$$(T) = n(T_0) + (n/dT)(T-T_0). \qquad (11)$$

With regard to the medium in which the index change takes place, the following relationship is known from W. Koechner, Solid State Laser Engineering, 6th ed., Springer, Berlin, (2006) p.439-481:

$$(dn_{abs}/dT) = n_{med}(dn_{rel}/dT) + n_{rel}(dn_{med}/dT) \qquad (12)$$

where $n_{abs}$ (absolute) refers to the refractive index with respect to vacuum and $n_{rel}$ (relative) index with respect to the medium of interest (e.g., air). The $dn_{med}/dT$ of air is non-negligible amount at −0.93 ppm/K, and this can produce significant differences between measured values of $dn_{abs}/dT$ and $dn_{rel}/dT$ [Davis et al., "Thermal lensing of laser materials", in Laser-Induced Damage in Optical Materials: 2014, Exarhos et al. (eds); Proceedings of SPIE Vol. 9237 (SPIE, Bellingham, Wash. 2014), 92371].

For purposes here, where internal changes in refractive index are encountered, $dn_{abs}/dT$ is the relevant property. The temperature induced dioptric power of the gain material can be related to the dissipated heat in the rod ($P_h$) and the thermal conductivity by equation (13)

$$D_{thermo} = (P_h/\pi r_o^2 K)(dn_{abs}/dT). \qquad (13)$$

The data collected for the experimental glasses is compared in table 4.

Absorption due to the water molecules present in the glass structure was assessed and is presented in table 5 for the glasses being evaluated. As stated previously; for a laser grade glass gain element, the absorption must be less than 2.0 cm$^{-1}$ and most preferably less than 1.8 cm$^{-1}$ at the wavelength of 3000 nm regardless of the active ion present in the glass.

The J-O calculated and the measured lifetimes for the Er$^{3+}$ laser ion and the measured lifetimes for the Yb sensitizing ion are presented in table 6. An estimate of the quantum yield can be obtained from calculated and measured lifetime ratios [J. S. Hayden, Y. T. Hayden, J. H. Campbell; Effect of composition on the thermal, mechanical, and optical properties of phosphate laser glasses. Proc. SPIE 1277, High-Power Solid State Lasers and Applications, 121 (Aug. 1, 1990)]. This is also given in table 6. The quantum efficiencies will never be unity due to the fact that various nonradiative loss mechanisms will impact the emission lifetime. Significant shortening of the lifetime is observed in the presence of hydroxyl species and transition metal ion impurities such as Cu$^{2+}$, Ni$^{2+}$, Fe$^{2+}$, Co$^{2+}$, etc. In the absence of hydroxyl and ionic impurities, measured lifetimes tend to be longer than the calculated radiative lifetimes due to the Er self-pumping as observed in the data presented in table 6. The only exception is Example 17, which shows a shorter measured lifetime than the calculated lifetime. This fits the expected result, considering the high OH-absorption found in table 5 for this particular glass.

Calculated laser properties for the Er3 laser ion is given in table 7. As mentioned above L-FOMs are calculated by the equation L-FOM=$\sigma_{em}*(\tau_{meas}/\tau_{rad})$.

TABLE 1A

Examples of Phosphate-based Glass Compositions (mol %) doped with Er$^{3+}$ and sensitized with Yb$^{3+}$

| Metal Oxide Content | EXAMPLES | | | | | | | | | |
|---|---|---|---|---|---|---|---|---|---|---|
| | 2 | 3 | 4 | 5 | 6 | 7 | 8 | 9 | 10 | 11 |
| P$_2$O$_5$ | 54.80 | 58.00 | 58.00 | 58.00 | 58.00 | 58.00 | 58.00 | 58.00 | 58.00 | 58.00 |
| Al$_2$O$_3$ | 7.35 | 7.35 | 8.35 | 6.35 | 6.35 | 6.35 | 6.35 | 11.35 | 16.35 | 6.352 |
| K$_2$O | 6.46 | 5.70 | 5.47 | 5.47 | 5.97 | 5.97 | 4.97 | 5.97 | 5.97 | 5.97 |
| Na$_2$O | 22.67 | 18.99 | 18.24 | 19.74 | 18.74 | 19.72 | 19.74 | 14.74 | 9.74 | 14.74 |
| MgO | | | | 0.500 | | | | | | 5.000 |
| Li$_2$O | | | | | 1.000 | | | | | |
| SiO$_2$ | | | | | | | | 1.000 | | |
| TeO$_2$ | | | | | | | | | | |
| Bi$_2$O$_3$ | | | | | | | | | | |
| GeO$_2$ | | | | | | | | | | |
| Nb$_2$O$_3$ | 0.80 | 0.85 | 0.845 | 0.85 | 0.85 | 0.84 | 0.85 | 0.85 | 0.85 | 0.85 |
| Sb$_2$O$_3$ | 0.09 | 0.010 | 0.10 | 0.10 | 0.10 | 0.20 | 0.10 | 0.10 | 0.10 | 0.10 |
| Cr$_2$O$_3$ | 0.04 | 0.04 | 0.04 | 0.04 | 0.04 | 0.04 | 0.04 | 0.04 | 0.04 | 0.04 |
| CeO$_2$ | 0.14 | 0.15 | 0.15 | 0.15 | 0.15 | 0.15 | 0.15 | 0.15 | 0.15 | 0.15 |
| Er$_2$O$_5$ | 0.06 | 0.06 | 0.06 | 0.06 | 0.06 | 0.06 | 0.06 | 0.06 | 0.06 | 0.06 |
| Yb$_2$O$_3$ | 8.60 | 8.77 | 8.77 | 8.77 | 8.77 | 8.76 | 8.77 | 8.77 | 8.77 | 8.77 |
| Total | 100.0 | 100.0 | 100.0 | 100.0 | 100.0 | 100.0 | 100.0 | 100.0 | 100.0 | 100.0 |

TABLE 1B

Examples of Phosphate-based Glass Compositions (mol %) doped with Er$^{3+}$ and sensitized with Yb$^{3+}$

| Metal Oxide Content | EXAMPLES | | | | | | | | | | |
|---|---|---|---|---|---|---|---|---|---|---|---|
| | 12 | 13 | 14 | 15 | 16 | 17 | 18 | 19 | 20 | 21 | 22 |
| P$_2$O$_5$ | 58.00 | 58.00 | 57.70 | 58.00 | 58.00 | 58.00 | 58.00 | 58.00 | 58.00 | 57.70 | 58.00 |
| Al$_2$O$_3$ | 6.35 | 21.35 | 26.2 | 6.35 | 6.35 | 6.35 | 6.35 | 6.35 | 6.35 | 6.32 | 6.35 |
| K$_2$O | 5.97 | 3.97 | 2.96 | 3.97 | 2.97 | 5.97 | 3.97 | 2.97 | 5.97 | 5.95 | 5.97 |
| Na$_2$O | 9.74 | 6.74 | 2.72 | 6.74 | 2.74 | 9.74 | 6.74 | 2.74 | 17.74 | 17.66 | 17.74 |
| MgO | 10.00 | | | 15.00 | 20.00 | | | | | | |
| Li$_2$O | | | | | | | | | | | |
| SiO$_2$ | | | | | | 10.00 | 15.00 | 20.00 | | | |
| TeO$_2$ | | | | | | | | | 2.00 | | |
| Bi$_2$O$_3$ | | | | | | | | | | 2.00 | |
| GeO$_2$ | | | | | | | | | | | 2.00 |
| Nb$_2$O$_3$ | 0.85 | 0.85 | 0.85 | 0.85 | 0.85 | 0.85 | 0.85 | 0.85 | 0.85 | 0.84 | 0.85 |
| Sb$_2$O$_3$ | 0.10 | 0.10 | 0.10 | 0.10 | 0.10 | 0.010 | 0.10 | 0.10 | 0.10 | 0.10 | 0.100 |
| Cr$_2$O$_3$ | 0.04 | 0.04 | 0.04 | 0.04 | 0.04 | 0.04 | 0.04 | 0.04 | 0.04 | 0.04 | 0.04 |
| CeO$_2$ | 0.15 | 0.15 | 0.15 | 0.15 | 0.15 | 0.15 | 0.15 | 0.15 | 0.15 | 0.15 | 0.15 |
| Er$_2$O$_5$ | 0.06 | 0.06 | 0.06 | 0.06 | 0.06 | 0.06 | 0.06 | 0.06 | 0.06 | 0.07 | 0.06 |
| Yb$_2$O$_3$ | 8.77 | 8.77 | 9.25 | 8.77 | 8.77 | 8.77 | 8.77 | 8.77 | 8.77 | 9.16 | 8.77 |
| Total | 100.0 | 100.0 | 100.0 | 100.0 | 100.0 | 100.0 | 100.0 | 100.0 | 100.0 | 100.0 | 100.0 |

TABLE 2

Material Properties of Glasses Selected for Larger Scale Manufacture

| Property | Examples | | | | | | | |
|---|---|---|---|---|---|---|---|---|
| | LG940 | 4 | 9 | 10 | 11 | 17 | 20 | 21 |
| Refractive Index at 587 nm @ 30° C./hr, $n_d$ | 1.5385 | 1.5385 | 1.5389 | 1.5391 | 1.5352 | 1.5414 | 1.5414 | 1.5583 |
| Dispersion (Abbe Number), $V_d$ | 61.84 | 62.33 | 62.62 | 62.44 | 62.44 | 62.42 | 60.77 | 55.76 |
| Density, $\rho$ [g/cm$^3$] | 3.11 | 3.10 | 3.10 | 3.09 | 3.09 | 3.06 | 3.11 | 3.26 |
| Linear Coefficient of Thermal Expansion, $\alpha_{20\text{-}300C}$ [$10^{-7}$/K] | 119.6 | 108.6 | 93.0 | 78.7 | 104.3 | 89.9 | 113.1 | 113.1 |
| Glass Transition Temperature, $T_g$ [° C.] | 456 | 465 | 503 | 541 | 476 | 501 | 451 | 450 |
| Thermal Conductivity @ 25° C., $K_{25C}$ [W/mK] | 0.50 | 0.56 | 0.60 | 0.64 | 0.60 | 0.57 | 0.54 | 0.54 |
| Thermal Conductivity @ 90° C., $K_{90C}$ [W/mK] | 0.60 | 0.60 | 0.66 | 0.69 | 0.60 | 0.61 | 0.58 | 0.58 |
| Young's Modulus, E [GPa] | 57.2 | 60.34 | 64.80 | 69.08 | 61.08 | 60.24 | 57.92 | 59.43 |
| Poisson Ratio, $\nu$ | 0.26 | 0.26 | 0.25 | 0.24 | 0.25 | 0.25 | 0.26 | 0.26 |
| Indentation Fracture Toughness for 4.0N Load, $K_{IC}$ [MPa·m$^{1/2}$] | 0.61 | 0.66 | 0.68 | 0.76 | 0.62 | 0.76 | 0.64 | 0.61 |
| Knoop Hardness, HK | 380 | 402.5 | 430.8 | 455.0 | 401.5 | 412.6 | 371.4 | 372 |

TABLE 3

TM-FOM Comparison

| | Examples | | | | | | | |
|---|---|---|---|---|---|---|---|---|
| | LG940 | 4 | 9 | 10 | 11 | 17 | 20 | 21 |
| $\text{FOM}_{TM} = K_{90°C} K_{IC}(1-\nu)/(\alpha E)$ [W/m$^{1/2}$] | 0.39 | 0.45 | 0.56 | 0.72 | 0.44 | 0.64 | 0.42 | 0.39 |
| % improvement from LG940 | | −14% | 43% | 85% | 13% | 64% | 6% | −1% |

TABLE 4

Thermal-Optical Response

| Optical/Thermal/Physical Property | Glasses | | | | | | | |
|---|---|---|---|---|---|---|---|---|
| | LG940 | 4 | 9 | 10 | 11 | 17 | 20 | 21 |
| Refractive Index at 587 nm @ 30° C./hr, $n_d$ | 1.5385 | 1.5385 | 1.5409 | 1.5389 | 1.5352 | 1.5352 | 1.5414 | 1.5583 |
| Linear Coefficient of Thermal Expansion, $\alpha_{20\text{-}300C}$ [$10^{-7}$/K] | 119.6 | 108.6 | 93.0 | 78.7 | 104.3 | 89.9 | 113.1 | 113.1 |
| Thermal Conductivity @ 90° C., $K_{90C}$ [W/mK] | 0.60 | 0.60 | 0.66 | 0.68 | 0.60 | 0.60 | 0.57 | 0.58 |
| dn/dT @ 1500 nm (absolute) ppm/° C. | −5.0 | −2.7 | −0.7 | 1.7 | −2.1 | −0.3 | −3.2 | −3.0 |
| dn/dT @ 1500 nm (rd. to air) ppm/° C. | −3.6 | −1.3 | 0.8 | 3.2 | −0.7 | 1.2 | −1.7 | −1.6 |
| TL-FOM from dioptric power, 1/K*dn/dT | −8.3 | −4.5 | −1.1 | 2.5 | −3.5 | −0.5 | −5.5 | −5.2 |

TABLE 5

Hydroxyl Content

| Property | Examples | | | | | | | | | |
|---|---|---|---|---|---|---|---|---|---|---|
| | LG940 | 4 | 9 | 9 (0.5 L) | 9 (3.0 L) | 10 | 11 | 17 (0.5 L) | 17 (3.0 L) | 20 | 21 |
| OH absorbtion @ 3.0 µm [cm$^{-1}$] | 0.35 | 0.78 | 0.56 | 0.33 | 0.39 | 0.59 | 1.54 | 0.45 | 0.72 | 0.54 |
| OH absorption @ 3.33 µm [cm$^{-1}$] | 0.66 | 1.42 | 0.92 | 0.50 | 0.54 | 1.06 | 3.04 | 0.83 | 1.31 | 0.99 |

TABLE 6

Calculated and Measured Lifetimes

| Property | Examples | | | | | | | |
|---|---|---|---|---|---|---|---|---|
| | LG940 | 4 | 9 | 10 | 11 | 17 | 20 | 21 |
| Calculated Radiative Lifetime (ms) | 8.2 | 8.3 | 9.6 | 10.3 | 8.8 | 8.9 | 8.7 | 8.6 |

TABLE 6-continued

Calculated and Measured Lifetimes

| Property | LG940 | \multicolumn{7}{c}{Examples} |
|---|---|---|---|---|---|---|---|---|

| Property | LG940 | 4 | 9 | 10 | 11 | 17 | 20 | 21 |
|---|---|---|---|---|---|---|---|---|
| Measured fluorescence Lifetime (ms) Er | 9.4 | 9.5 | 9.8 | 10.5 | 9.5 | 8.4 | 9.4 | 9.4 |
| Measured fluorescence Lifetime (ms) Yb | 6.8 | 9.7 | 10.2 | 10.2 | 10.0 | 8.3 | 9.2 | 9.4 |
| Quantum yield (Er ion) ($\tau_{rad}/\tau_{meas.}$) | 0.87 | 0.87 | 0.98 | 0.98 | 0.93 | 1.06 | 0.93 | 0.91 |

TABLE 7

Er Laser Properties (J-O Method)

| Laser Property | LG940 | 4 | 9 | 10 | 11 | 17 | 20 | 21 |
|---|---|---|---|---|---|---|---|---|
| Emission Cross Section, $\sigma_{em}$ [$\times 10^{-20}$ cm$^2$] | 0.77 | 0.76 | 0.67 | 0.65 | 0.72 | 0.70 | 0.72 | 0.67 |
| Peak Emission Wavelength (nm) | 1535.1 | 1535.0 | 1535.4 | 1535.7 | 1535.4 | 1534.9 | 1534.9 | 1534.2 |
| Effective Linewidth (nm) | 50.1 | 49.8 | 48.8 | 46.8 | 49.4 | 50.4 | 50.5 | 53.3 |
| Linewidth FWHM (nm) | 30.3 | 29.8 | 28.6 | 26.5 | 29.7 | 30.1 | 30.8 | 33.6 |
| Radiative Lifetime (ms) | 8.2 | 8.3 | 9.6 | 10.3 | 8.8 | 8.9 | 8.7 | 8.6 |
| Peak Gain Coefficient at 50% Population Inversion (cm$^{-1}$) | 0.018 | 0.016 | 0.015 | 0.014 | 0.018 | 0.015 | 0.017 | 0.017 |
| Wavelength of 50% Inversion (nm) | 1551.3 | 1556.1 | 1537.8 | 1549.5 | 1537.6 | 1537.1 | 1537.6 | 1557.2 |
| L-FOM, % improvement from LG940 | 0% | −1% | 3% | −4% | 0% | 11% | 0% | −8% |
| TM-FOM, % improvement from LG940 | 0% | −14% | 43% | 85% | 13% | 64% | 6% | −1% |

The entire disclosure[s] of all applications, patents and publications, cited herein, are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A phosphate glass composition comprises (based on mol %):

| | |
|---|---|
| $P_2O_5$ | 55.00-65.00 |
| $Al_2O_3$ | 4.00-20.00 |
| $K_2O$ | 4.00-8.00 |
| $Na_2O$ | 8.00-18.50 |
| $Li_2O$ | 00.0-2.00 |
| $Rb_2O$ | 0.00-2.00 |
| $Cs_2O$ | 0.00-2.00 |
| $SiO_2$ | 0.00-12.00 |
| MO | 0.00-7.00 |
| $Bi_2O_3$ | 0.00-3.00 |
| $TeO_2$ | 0.00-3.00 |
| $GeO_2$ | 0.00-1.00 |
| $Nb_2O_5$ | 0.00-2.00 |
| $Sb_2O_3$ | 0.00-0.50 |
| $Cr_2O_3$ | 0.00-0.50 |
| $CeO_2$ | 0.00-0.30 |
| $Er_2O_3$ | 0.03-1.00 |
| $Yb_2O_3$ | 5.00-10.00 |
| $R_2O$ | 12.00-25.00 | wherein $R_2O$=the sum of the amounts of $Li_2O$, $Na_2O$, $K_2O$, $Rb_2O$ and $Cs_2O$;

MO=the sum of the amounts of MgO, CaO, SrO, BaO, and ZnO; and wherein the sum of $Al_2O_3$, $SiO_2$, and $Na_2O$ is 20.00-28.00 mol %.

2. A glass composition according to claim 1, wherein the amount of $P_2O_5$ is 55.00-60.00 mol %.

3. A glass composition according to claim 1, wherein the amount of $P_2O_5$ is 57.00-60.00 mol %.

4. A glass composition according to claim 1, wherein the amount of $Al_2O_3$ is 5.00-7.00 mol %.

5. A glass composition according to claim 1, wherein the amount of $Al_2O_3$ is 10.00-12.00 mol %.

6. A glass composition according to claim 1, wherein the amount of $Al_2O_3$ is 15.00-18.00 mol %.

7. A glass composition according to claim 1, wherein the amount of $K_2O$ is 5.00-7.00 mol %.

8. A glass composition according to claim 1, wherein the amount of $K_2O$ is 5.50-6.5 mol %.

9. A glass composition according to claim 1, wherein the amount of $Na_2O$ is 9.00-16.00 mol %.

10. A glass composition according to claim 1, wherein the amount of $Na_2O$ is 10.00-15.00 mol %.

11. A glass composition according to claim 1, wherein the amount of $Li_2O$ is 0.00-1.00 mol %.

12. A glass composition according to claim 1, wherein the amount of $Rb_2O$ is 0.00-1.00 mol %.

13. A glass composition according to claim 1, wherein the amount of $Cs_2O$ is 0.00-1.00 mol %.

14. A glass composition according to claim 1, wherein the amount of $SiO_2$ is 0.00-11.00 mol %.

15. A glass composition according to claim 1, wherein the amount of $SiO_2$ is 4.00-11.00 mol %.

16. A glass composition according to claim 1, wherein the amount of MO is 0.00-6.00 mol %.

17. A glass composition according to claim 1, wherein the amount of MO is 0.00-5.00 mol %.

18. A glass composition according to claim 1, wherein the amount of $TeO_2$ is 0.00-2.50 mol %.

19. A glass composition according to claim 1, wherein the amount of $TeO_2$ is 0.00-2.00 mol %.

20. A glass composition according to claim 1, wherein the amount of $GeO_2$ is 0.00-0.50 mol %.

21. A glass composition according to claim 1, wherein the amount of $GeO_2$ is 0.00-0.10 mol %.

22. A glass composition according to claim 1, wherein the amount of $Nb_2O_5$ is 0.50-2.00 mol %.

23. A glass composition according to claim 1, wherein the amount of $Nb_2O_5$ is 0.50-1.50 mol %.

24. A glass composition according to claim 1, wherein the amount of $Sb_2O_3$ is 0.05-0.30 mol %.

25. A glass composition according to claim 1, wherein the amount of $Sb_2O_3$ is 0.05-0.20 mol %.

26. A glass composition according to claim 1, wherein the amount of $Cr_2O_3$ is 0.01-0.10 mol %.

27. A glass composition according to claim 1, wherein the amount of $Cr_2O_3$ is 0.02-0.05 mol %.

28. A glass composition according to claim 1, wherein the amount of $CeO_2$ is 0.00-0.20 mol %.

29. A glass composition according to claim 1, wherein the amount of $CeO_2$ is 0.10-0.20 mol %.

30. A glass composition according to claim 1, wherein the amount of $Er_2O_3$ is 0.03-0.10 mol %.

31. A glass composition according to claim 1, wherein the amount of $Er_2O_3$ is 0.03-0.08 mol %.

32. A glass composition according to claim 1, wherein the amount of $Er_2O_5$ is 0.05-0.08 mol %.

33. A glass composition according to claim 1, wherein the amount of $Yb_2O_3$ is 6.00-10.00 mol %.

34. A glass composition according to claim 1, wherein the amount of $Yb_2O_3$ is 7.00-10.00 mol %.

35. A glass composition according to claim 1, wherein the amount of $R_2O$ is 14.00-22.00 mol %.

36. A glass composition according to claim 1, wherein the amount of $R_2O$ is 15.00-21.00 mol %.

37. A glass composition according to claim 1, wherein the amount of the sum of $Al_2O_3$, $SiO_2$, and $Na_2O$ is 22.00-28.00 mol %.

38. A glass composition according to claim 1, wherein the amount of the sum of $Al_2O_3$, $SiO_2$, and $Na_2O$ is 25.00-28.00 mol %.

39. In a solid state laser system comprising a solid gain medium and a pumping source, the improvement wherein said solid gain medium is a glass having a composition in accordance with claim 1.

40. A method for generating a laser beam pulse comprising flashlamp pumping or diode pumping a glass composition according to claim 1.

* * * * *